No. 672,562. Patented Apr. 23, 1901.
W. G. LONG.
CYLINDRICAL COTTON PRESS.
(Application filed May 28, 1900.)
(No Model.) 2 Sheets—Sheet 1.
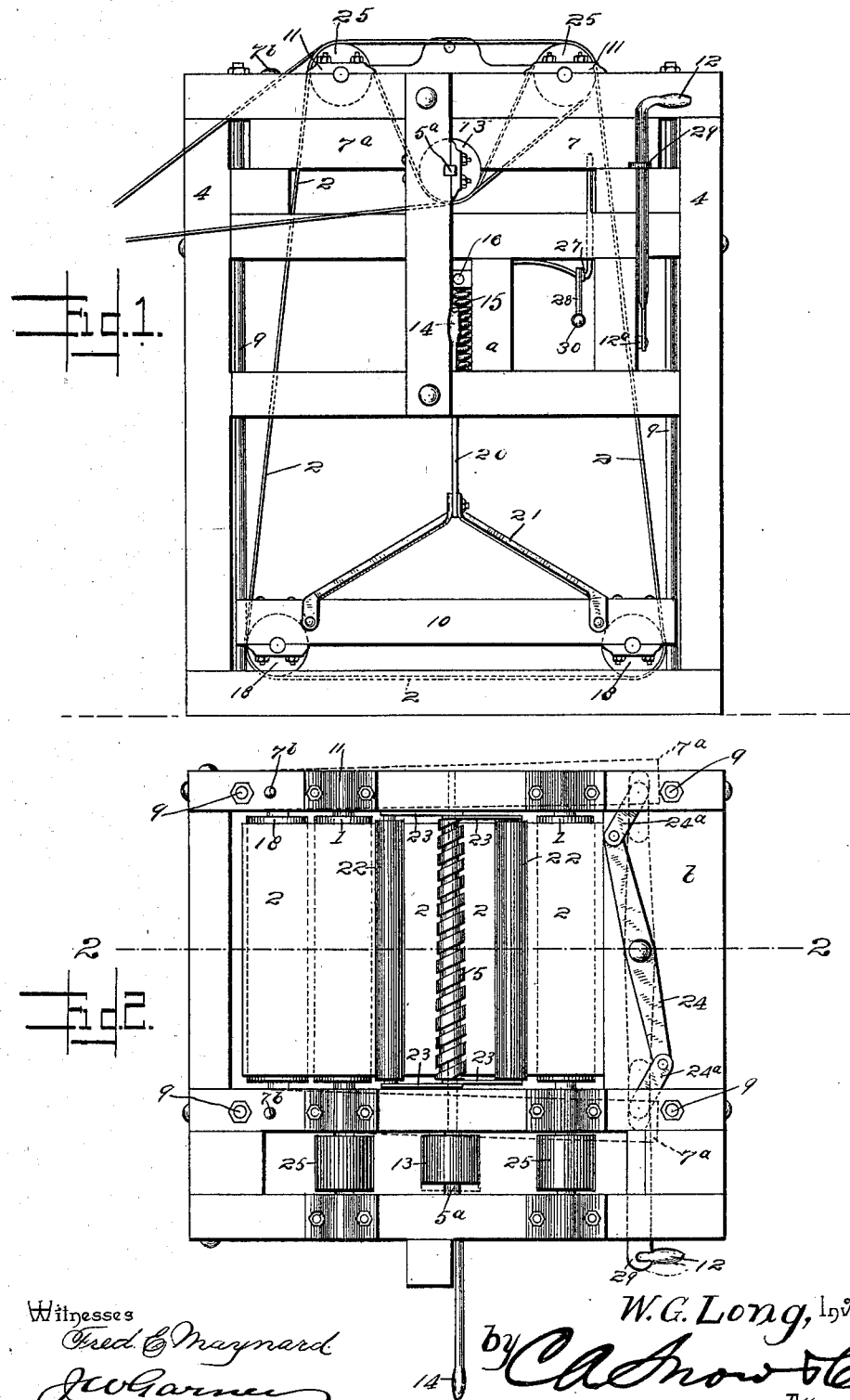
Witnesses
Fred E Maynard
J W Garner
W. G. Long, Inventor.
by C A Snow & Co.
Attorneys
THE NORRIS PETERS CO., PHOTO-LITHO., WASHINGTON, D. C.

No. 672,562. Patented Apr. 23, 1901.
W. G. LONG.
CYLINDRICAL COTTON PRESS.
(Application filed May 28, 1900.)
(No Model.) 2 Sheets—Sheet 2.
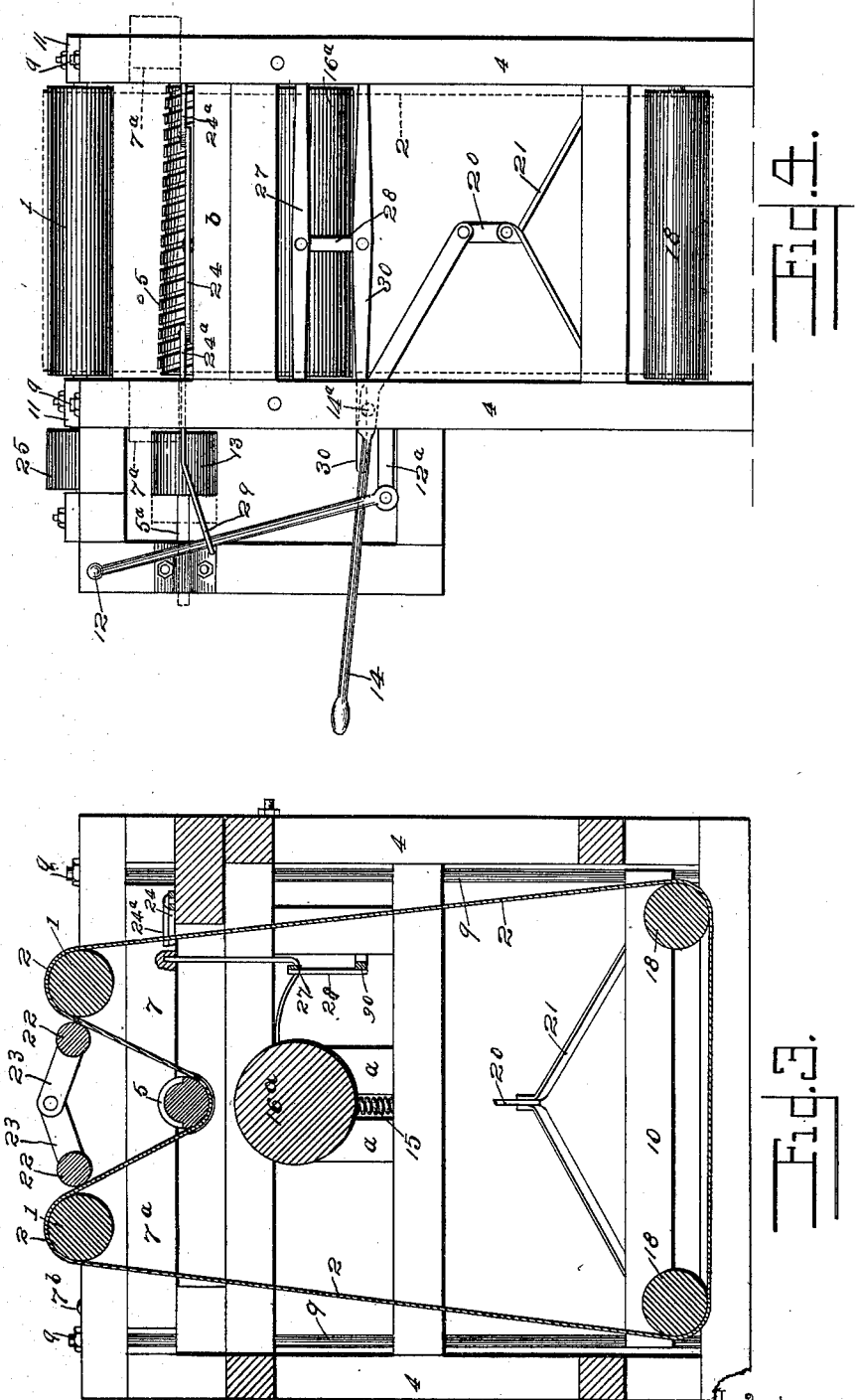

UNITED STATES PATENT OFFICE.

WILLIAMSON G. LONG, OF WARD, INDIAN TERRITORY.

CYLINDRICAL COTTON-PRESS.

SPECIFICATION forming part of Letters Patent No. 672,562, dated April 23, 1901.

Application filed May 28, 1900. Serial No. 18,350. (No model.)

*To all whom it may concern:*

Be it known that I, WILLIAMSON G. LONG, a citizen of the United States, residing at Ward, in the county of Skullyville, Choctaw Nation, Indian Territory, have invented a new and useful Cotton-Press, of which the following is a specification.

My invention is an improved press for forming cylindrical bales of cotton or other material; and it consists in the peculiar construction and combination of devices hereinafter set forth, and pointed out in the claims.

In the accompanying drawings, Figure 1 is a side elevation of a press constructed in accordance with my invention. Fig. 2 is a top plan view of the same. Fig. 3 is a vertical sectional view taken on a plane indicated by the line 2 2 of Fig. 2. Fig. 4 is an elevation at right angles to Fig. 1.

In the embodiment of my invention I provide a vertical framework 4, which may be of any suitable construction and is provided near its corners with vertical guide-rods 9, on which is guided a vertically-movable frame 10, which carries a pair of rollers 18. A lever 14 is fulcrumed to one side of the frame 4, as at $14^a$, and the inner end of said lever is connected to a bale 21 on the upper side of frame 10 by a link 20. By this means the frame 10, together with the rollers 18, which it carries, may be raised when the same becomes necessary.

In the sides of the frame 4, at the center thereof, are vertical guideways $a$, in which are vertically-movable bearing-blocks 16, which are supported by bearing-springs 15. A cylindrical roller $16^a$ has the ends of its shaft journaled in said bearing-blocks 16. Thereby the said roller $16^a$ is adapted to be depressed from above against the tension of the springs 15 by the cotton wound on the core-roller 5 as its diameter enlarges during the formation of a cylindrical bale.

A frame 7, which is horizontally disposed in the upper portion of the frame 4, comprises the side bars $7^a$, which are pivoted at one end, as at $7^b$, and are adapted thereby to be opened and closed at their free ends, the free ends of the said bars $7^a$ being connected together by a link 24, which is pivoted on a suitable cross-bar $b$, with which the frame is provided, and links $24^a$, which connect the ends of said pivoted link 24 to said bars $7^a$. A link 29 extends laterally from one of the said bars $7^a$ and is connected at its outer end to a hand-lever 12, the latter being pivoted at its lower end to a bracket or other suitable support $12^a$, disposed on one side of the frame 4. It will be understood from the foregoing that by operating said hand-lever 12 said bars $7^a$ may be moved laterally toward or from each other. The said bars $7^a$ are provided at their centers, on their under sides, with bearings $5^a$ $5^b$, respectively. A shaft $13^a$, which carries a power-pulley 13, is journaled in a fixed bearing $13^b$ on the frame and in the bearing $5^a$. The inner end of said shaft is squared or angular in cross-section and is adapted to fit in a correspondingly-shaped socket of a tapered core-roller 5, which is spirally grooved, as shown, and has a spindle at the end opposite the socket, which spindle is adapted to be readily placed in and unshipped from the bearing $5^b$. Hence the core-roller may be readily mounted for rotation in the formation of a bale and readily unshipped from its bearings in order to remove a completed bale from the press. The tapered form of the core-roller and the screw-threads thereon facilitate the subsequent removal of the core-roller from the completed bale. The free ends of bars $7^a$ are moved outward from each other to unship the core-roller from its bearings and toward each other to mount said core-roller in its bearings, as will be understood.

A pair of rollers 1 have their bearings on the upper side of the frame 4. The said rollers 1, together with the rollers 18, are connected together by an endless traveling feed-belt 2, which also initially engages the lower side of the core-roller 5 and is adapted to convey cotton or the like material to the said core-roller, so that by the revolution of the said core-roller and the motion of the said belt 2 the cotton may be compressed around the said core-roller into a cylindrical bale, said core-roller coacting with the roller $16^a$ in the formation of the bale. The shafts of the rollers 1 are provided with pulleys 25, which are connected to the pulley 13 by an endless belt Z, as shown in Fig. 1, whereby the said rollers 1 18 and core-roller 5 may be rotated in unison, the endless traveling belt 2 conveying motion from the rollers 1 to the rollers 18, which latter are direction-rollers, and also by their own weight and that of the frame 10, by which they are carried, serve to keep the feed-belt 2 at the requisite tension during the formation of the bales.

Rocking arms 23 have their inner ends pivotally supported on the sides of the frame 4. Said rocking arms carry rollers 22, which bear upon the feed-belt 2.

By means of a lever 30, which is connected to a bar 27 by a link 28, said bar may be raised to engage the bolts 27ª, carried thereby, with openings in the side-bars 7ª, so as to lock the latter, and thereby secure the core-roller in its bearings. When said bar is depressed by said lever, said bars 7ª are unlocked and may then be opened when a bale has been formed to facilitate the removal of the completed bale, together with the core-roller, from the press. The tapered form of the core-roller and the spiral thread thereon enable the core-roller to be readily removed from the bale, as will be understood.

During the operation of the press the feed-belt 2 runs at a uniform rate of speed. During the initial stage of the formation of a bale the center thereof revolves rapidly, each portion of the bat as it is wound upon the bale being repeatedly subjected to the pressure of the feed-belt. As the diameter of the bale enlarges, the same revolves at constantly-decreasing speed. The roller 16ª, as the bale enlarges, presses against the same through the feed-belt to increase the density of compression of the outer layers of the bale, and since the said roller is provided with spring-supported bearings, said roller recedes from the core of the bale as the latter enlarges against the tension of its supporting-springs, which is increased progressively, the pressure of the roller 16ª on the bale increasing as the speed of rotation of the latter diminishes, with the result that the layers of the bale are uniformly compressed from the core to the circumference of the bale. The springs 15, which support the roller 16ª, are here shown as coil-springs, but this may be modified, and any suitable pressure mechanism or means may be employed within the scope of my invention to thus support the roller and increase its pressure on the bale as the latter enlarges and its rate of rotation is decreased. The rollers 22, by their weight, coact with the feed-belt to compress the bat somewhat as the same is fed to the bale.

In operation the feed-belt may be run in either direction. Hence two of the rollers 22 are provided.

Having thus described my invention, I claim—

1. In a press of the class described, the combination of a vertically-movable frame having rollers, rollers in fixed bearings, a core-roller, supporting-bearings therefor, and means to unship said core-roller from said supporting-bearings, an endless traveling feed-belt connecting said rollers, and a spring-pressed roller in movable bearings in position to engage said feed-belt as the bale increases in size, and coacting with the said core-roller, substantially as described.

2. In a press of the class described, the combination of a main frame, rollers in fixed bearings thereon, a shaft in fixed bearings and geared to said rollers, and revoluble therewith, a pair of bars hinged at one end to the main frame, means to move said bars laterally, a core-roller having bearings in said bars and thereby adapted to be removed from the press, said core-roller being revoluble with said shaft, a spring-pressed roller in movable bearings and coacting with said core-roller, a vertically-movable frame, guided in the main frame and having rollers, and an endless traveling feed-belt engaged by the rollers in the main and vertically-movable frames and by the core-roller, said vertically-movable frame being suspended by said feed-belt, substantially as described.

3. In a press of the class described, the combination of a main frame, rollers in fixed bearings thereon, a shaft in fixed bearings and geared to said rollers, and revoluble therewith, a pair of bars hinged at one end to the main frame, a centrally-pivoted link 24 having a fixed pivot-link, links connecting the ends of said link 24 to the free ends of said bars, a lever connected to one of the said links to move said bars laterally, means to lock said bars, for the purpose set forth, a core-roller having bearings in said bars, and thereby adapted to be removed from the press, said core-roller being revoluble with said shaft, a roller in movable bearings and coacting with said core-roller, a vertically-movable frame guided in the main frame and having rollers, and an endless traveling feed-belt engaged by the rollers in the main and vertically-movable frames, and by the core-roller, substantially as described.

4. The combination of a core-roller in relatively-fixed bearings, an endless traveling feed and compression belt coacting with said core-roller, means to maintain the tension of said belt, a roller in movable bearings, in position to engage said feed-belt, as the diameter of the bale enlarges, and pressure mechanism to support said roller, substantially as described.

5. The combination of a core-roller in relatively-fixed bearings, an endless traveling feed and compression belt coacting with said core-roller, means to maintain the tension of said belt, a roller in movable bearings, in position to engage said feed-belt, as the diameter of the bale enlarges, and pressure mechanism to support said roller, and increase the pressure of said roller against the bale, as said roller recedes from the center of the bale, substantially as described.

In testimony whereof I have signed my name to this specification in the presence of two subscribing witnesses.

WILLIAMSON G. LONG.

Witnesses:
J. D. DOROUGH, Jr.,
J. T. ALLEN.